US012128916B2

(12) United States Patent
Hara et al.

(10) Patent No.: US 12,128,916 B2
(45) Date of Patent: Oct. 29, 2024

(54) DETECTION DEVICE AND DETECTION METHOD

(71) Applicant: ISUZU MOTORS LIMITED, Tokyo (JP)

(72) Inventors: Hideyuki Hara, Fujisawa (JP); Nobuhiro Hayashida, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 210 days.

(21) Appl. No.: 17/598,170

(22) PCT Filed: Mar. 23, 2020

(86) PCT No.: PCT/JP2020/012612
§ 371 (c)(1),
(2) Date: Sep. 24, 2021

(87) PCT Pub. No.: WO2020/196367
PCT Pub. Date: Oct. 1, 2020

(65) Prior Publication Data
US 2022/0176984 A1 Jun. 9, 2022

(30) Foreign Application Priority Data

Mar. 27, 2019 (JP) .................................. 2019-061342

(51) Int. Cl.
*B60W 50/14* (2020.01)
*B60W 40/02* (2006.01)
(Continued)

(52) U.S. Cl.
CPC ............ *B60W 50/14* (2013.01); *B60W 40/02* (2013.01); *G01S 17/04* (2020.01); *G01S 17/08* (2013.01);
(Continued)

(58) Field of Classification Search
CPC .. B60W 50/14; B60W 40/02; B60W 2555/20; B60W 2050/146; G01S 17/931;
(Continued)

(56) References Cited

U.S. PATENT DOCUMENTS 6,488,109 B1 12/2002 Igaki et al.
8,633,849 B2 * 1/2014 Shibata .................. G01S 13/345
342/70

(Continued)

FOREIGN PATENT DOCUMENTS

CN 102037317 A 4/2011
CN 102915542 A 2/2013
(Continued)

OTHER PUBLICATIONS

The State Intellectual Property Office of People's Republic of China, The First Office Action, Application No. 202080024966.2, dated Jul. 25, 2022, in 26 pages.

(Continued)

*Primary Examiner* — Thomas D Alunkal
(74) *Attorney, Agent, or Firm* — PROCOPIO, CORY, HARGREAVES & SAVITCH LLP

(57) ABSTRACT

A detection device 1 is provided with: a detection unit 121 which detects an object present around a vehicle V; a specification unit 122 which specifies a detection continuation time period in which the detection unit 121 has continuously detected the object; and an information output unit 123 which, on the condition that the detection continuation time period specified by the specification unit 122 has exceeded a determination time period for determining whether or not the object is a detection target object, outputs presence information indicating detection of the target object by the detection unit 121.

6 Claims, 7 Drawing Sheets

(51) Int. Cl.
- *G01S 17/04* (2020.01)
- *G01S 17/08* (2006.01)
- *G01S 17/58* (2006.01)
- *G01S 17/931* (2020.01)
- *G01W 1/14* (2006.01)

(52) U.S. Cl.
CPC ............ *G01S 17/58* (2013.01); *G01S 17/931* (2020.01); *G01W 1/14* (2013.01); *B60W 2050/146* (2013.01); *B60W 2555/20* (2020.02)

(58) Field of Classification Search
CPC .......... G01S 17/04; G01S 17/08; G01S 17/58; G01W 1/14
See application file for complete search history.

(56) References Cited

U.S. PATENT DOCUMENTS

| | | | |
|---|---|---|---|
| 2008/0204208 A1* | 8/2008 | Kawamata | G08G 1/166 340/435 |
| 2009/0032712 A1 | 2/2009 | Robert et al. | |
| 2011/0224901 A1 | 9/2011 | Aben et al. | |
| 2013/0188826 A1 | 7/2013 | Nishino | |
| 2014/0293264 A1* | 10/2014 | Miyazaki | G01S 7/481 356/4.01 |
| 2015/0186733 A1* | 7/2015 | Hayakawa | G06V 20/58 382/103 |
| 2018/0201260 A1 | 7/2018 | Ichikawa et al. | |
| 2018/0335774 A1* | 11/2018 | Sato | B60W 50/0098 |
| 2018/0372860 A1* | 12/2018 | Baba | G01S 13/867 |
| 2020/0386031 A1* | 12/2020 | Tsunekawa | B60R 25/2054 |

FOREIGN PATENT DOCUMENTS

| | | |
|---|---|---|
| CN | 104508727 A | 4/2015 |
| CN | 106761154 A | 5/2017 |
| JP | H07-296291 A | 11/1995 |
| JP | 2000-131433 A | 5/2000 |
| JP | 2001-114081 A | 4/2004 |
| JP | 2005-329779 A | 12/2005 |
| JP | 2008-114731 A | 5/2008 |
| JP | 2008-234029 A | 10/2008 |
| JP | 2009-085939 A | 4/2009 |
| JP | 2009-211715 A | 9/2009 |
| JP | 2016-114398 A | 6/2016 |
| JP | 2017-090379 A | 5/2017 |
| JP | 2017-090381 A | 5/2017 |
| JP | 2017-102054 A | 6/2017 |
| JP | 2018-115990 A | 7/2018 |

OTHER PUBLICATIONS

Patent Cooperation Treaty, International Search Report, Application No. PCT/JP2020/012612, dated Jun. 16, 2020, in 7 pages. PCT/ISA/237.

* cited by examiner

DETECTION DEVICE AND DETECTION METHOD

TECHNICAL FIELD

The present disclosure relates to a detection device and a detection method for detecting an object present around a vehicle.

BACKGROUND ART

A technique for detecting an object in a traveling direction of a vehicle by using a laser radar device mounted on the vehicle is disclosed (see, for example, Patent Literature 1).

CITATION LIST

Patent Literature
Patent Literature 1: JP-A-2016-114398

SUMMARY OF THE INVENTION

Technical Problem

When the vehicle travels on a wet road surface, a splash occurs in a vicinity of the vehicle. When a detection device which detects objects around the vehicle uses a laser radar device to detect objects around the vehicle, there is a problem that the detection device erroneously detects the splash generated when the vehicle travels on a wet road as a detection target object.

An object of the present disclosure is to provide a technique for preventing a device for detecting an object around a vehicle from erroneously detecting a splash or a mud splash as a detection target object.

Solution to Problem

A first aspect of the present disclosure is a detection device which includes a detection unit that detects an object present around a vehicle, a specification unit that specifies a detection continuation time period in which the detection unit continuously detects the object, and an information output unit that outputs presence information indicating that the detection unit detects a detection target object, on condition that the detection continuation time period specified by the specification unit exceeds a predetermined time period.

For example, the detection unit further detects a distance between the object and the vehicle at a time of detecting the object, and the information output unit does not output the presence information, in a case where the distance at a time when the detection unit first detects the object is equal to or less than a determination distance preset as a distance at which a splash or a mud splash is detected, and in a case where the detection continuation time period is equal to or less than the predetermined time period.

For example, the detection unit further detects a relative velocity between the object and the vehicle and the information output unit outputs the presence information on condition that the relative velocity detected by the detection unit is equal to or higher than a predetermined value.

The detection device may further include a rainfall specification unit that specifies a rainfall condition of a road on which the vehicle travels, and the information output unit may determine whether to output the presence information based on the rainfall condition of the road specified by the rainfall specification unit.

The rainfall specification unit may specify an amount of rainfall on the road on which the vehicle travels and the information output unit may lengthen the predetermined time period as the amount of rainfall specified by the rainfall specification unit increases.

The detection device may further include another detection unit that detects an object present around the vehicle using a method different from that of the detection unit, and the information output unit may output the presence information on condition that an object detected by the another detection unit and an object detected by the detection unit are determined to be the same object.

A second aspect of the present disclosure is a detection method which includes the steps, being executed by a processor installed in a vehicle, of detecting an object present around the vehicle, specifying a detection continuation time period in which the object is continuously detected, and outputting information indicating that a detection target object is detected, on condition that the specified detection continuation time period exceeds a predetermined time period.

Advantageous Effects of Invention

According to the present disclosure, it is possible to prevent a device which detects an object around a vehicle from erroneously detecting a splash or a mud splash as a detection target object.

DESCRIPTION OF EMBODIMENTS

Outline of Embodiment

Figure 1:
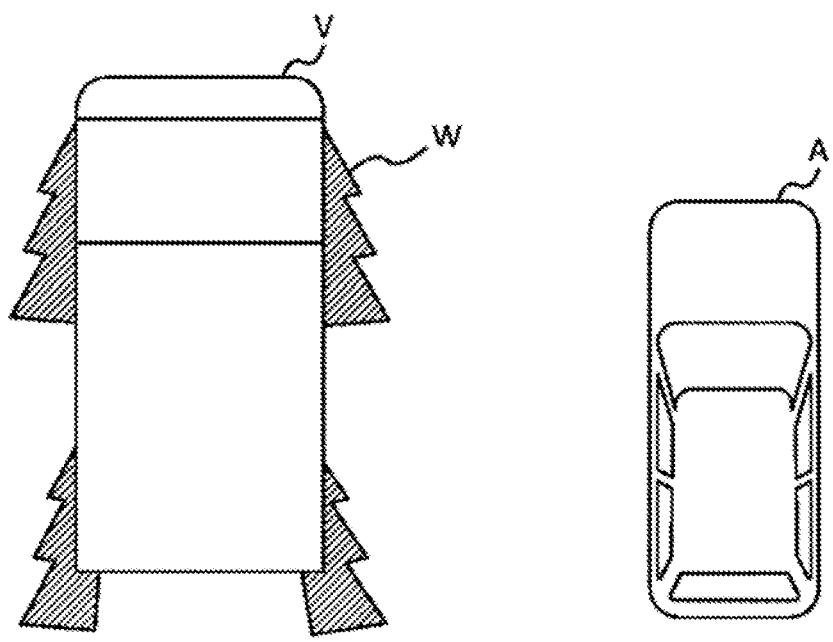
FIG. 1 is a view for explaining an outline of an embodiment.

FIG. 1 is a view for explaining an outline of an embodiment. FIG. 1 is a view schematically illustrating a situation in which a vehicle V travels on a wet road. The vehicle V includes a laser radar device (hereinafter, referred to as a LIDAR) which emits a laser in a pulsed manner to irradiate an object and measures a distance to the object based on scattered light rays with respect to the irradiation.

A detection device according to the embodiment tracks an object present around the vehicle V detected by the LIDAR. Tracking is a process of associating a detected object with an identification number and storing the association between the detected object and the identification number in a storage unit, and continuously specifying the same object among a plurality of objects in the time series detected by the LIDAR. The detection device specifies a detection continuation time period, which is the time period when it is determined that the same object continues to be present, based on a tracking result. The detection device outputs presence information indicating that a detection target object is detected, on condition that a specified detection continuation time period exceeds a predetermined time period.

Other vehicles around the vehicle V, as well as objects which are always present on the road, are continuously detected while the laser emitted by the LIDAR arrives. On the other hand, a splash W generated when the vehicle V travels on a wet road is temporarily generated, so that the time period continuously detected by the LIDAR is shorter than that of other objects. Therefore, the detection device does not determine that the detection target object is present when the detection continuation time period is equal to or less than a predetermined time period and determines that the detection target object is present on condition that the detection continuation time period exceeds the predetermined time period. In this way, it becomes difficult for the detection device to erroneously detect the splash W as a detection target object.

Configuration of Detection Device 1 According to Embodiment

Figure 2:
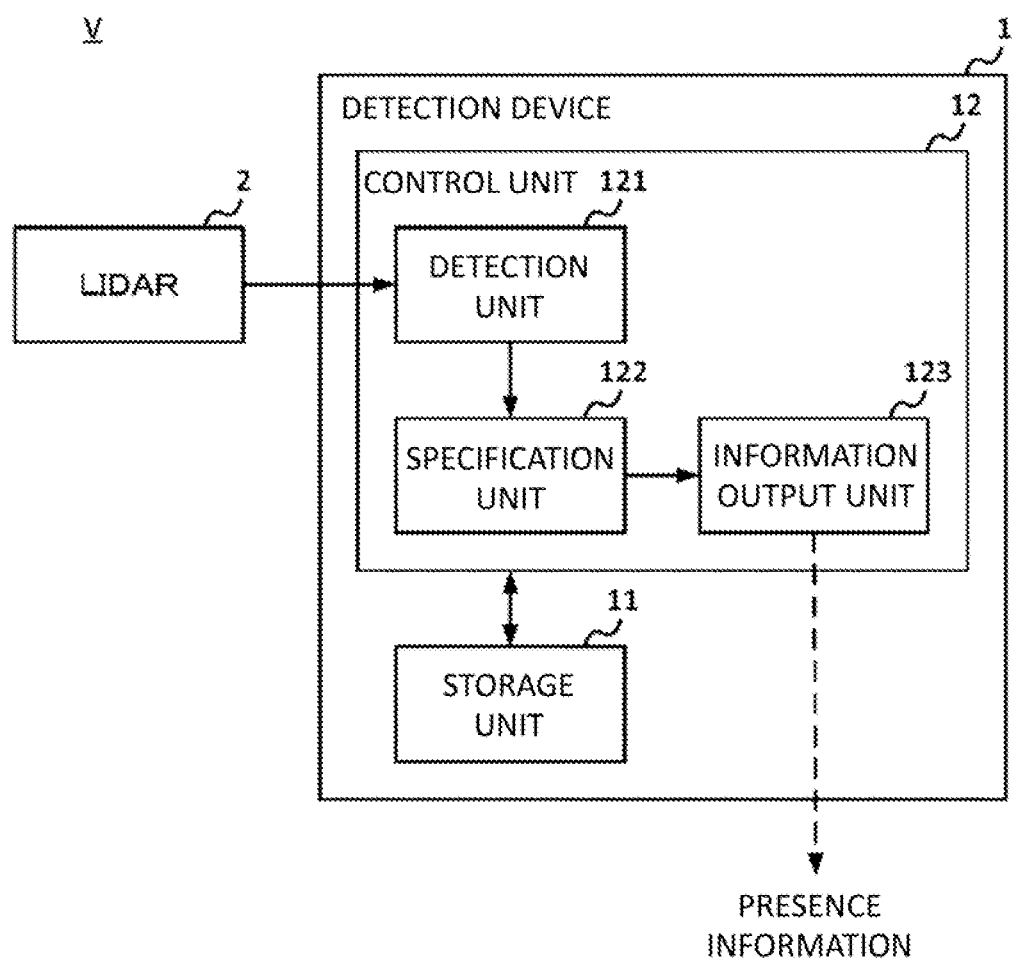
FIG. 2 is a diagram illustrating a configuration of a detection device.

FIG. 2 is a diagram illustrating a configuration of the detection device 1. The vehicle V on which the detection device 1 is mounted includes a LIDAR 2. The LIDAR 2 outputs a result (hereinafter, referred to as a detection result) of detecting an object around the vehicle V to the detection device 1. The detection result is, for example, the coordinates of a point cloud obtained by pulse reflection, or numerical data indicating the position, shape, and size of the detected object. The LIDAR 2 outputs the detection result to the detection device 1 every 50 ms, for example.

The detection device 1 includes a storage unit 11 and a control unit 12. The storage unit 11 is, for example, a Read Only Memory (ROM) or a Random Access Memory (RAM). The storage unit 11 stores various programs for operating the control unit 12.

The control unit 12 is a computing resource including a processor such as a Central Processing Unit (CPU). The control unit 12 realizes functions as a detection unit 121, a specification unit 122, and an information output unit 123 by executing the program stored in the storage unit 11.

The detection unit 121 detects an object present around the vehicle V. For example, the detection unit 121 specifies and tracks the position of an object by analyzing the detection result output by the LIDAR 2. The detection unit 121 stores the time when the object is first specified in the storage unit 11 as an object detection start time. Each time the detection unit 121 is notified of the detection result from the LIDAR 2, the detection unit 121 determines whether the detection result includes an object presumed to be the same object as the first specified object. When it is determined that the detection result includes an object (object being tracked) which is presumed to be the same object as the first specified object, the detection unit 121 stores the time when the detection result is notified in the storage unit 11 as a continuation detection time.

The detection unit 121 detects a relative velocity between the object and the vehicle V based on a change in the position of the object. The detection unit 121 may detect an initial detection distance between the object and the vehicle V at the time of detecting the object. The detection unit 121 notifies the specification unit 122 of the detected relative velocity and the initial detection distance.

The specification unit 122 specifies the detection continuation time period during which the detection unit 121 continuously detects the object. For example, in the specification unit 122, a difference between a latest continuation detection time stored in the storage unit 11 by the detection unit 121 and the object detection start time is set as the detection continuation time period.

On condition that the detection continuation time period specified by the specification unit 122 exceeds a determination time period for determining whether the object is a detection target object, the information output unit 123 outputs presence information indicating that the detection unit 121 detects the detection target object. Further, the information output unit 123 does not output the presence information of the object when the detection continuation time period is within the determination time period. The determination time period is longer than, for example, a maximum time expected to be required from occurrence of the splash W to disappearance of the splash W. In this way, the detection device 1 can prevent the splash which disappears with the lapse of time from being erroneously detected as a detection target object and outputting presence information.

The information output unit 123 outputs presence information to, for example, a display installed in a driver's seat of the vehicle V or a travel control device which controls the travel of the vehicle V. The information output unit 123 operates in this way, and thus a driver of the vehicle V or the travel control device can grasp the presence of another vehicle A traveling in a vicinity.

The splash W generated when the vehicle V travels continuously is present in the vicinity of the vehicle V. Therefore, when detecting the splash W, the detection unit 121 continues to detect an object having the same shape at the same position. As a result, a relative velocity between the splash W and the vehicle V becomes a value close to zero. Therefore, the information output unit 123 may set that the relative velocity between the object and the vehicle V is equal to or higher than a predetermined value as a condition for outputting presence information. For example, the information output unit 123 outputs presence information on condition that the relative velocity between the object detected by the detection unit 121 and the vehicle V is equal to or higher than a determination velocity for determining whether the detected object is the splash W. The determination velocity is a value in consideration of an error included in the measurement result of the LIDAR 2 and is, for example, five kilometers per hour. By doing so, the detection device 1 can prevent the detection device 1 from erroneously detecting the splash W whose relative velocity with respect to the vehicle V is almost zero as the detection target object.

The splash W occurs in the vicinity of the vehicle V and does not occur in a place some distance from the vehicle V. Therefore, the information output unit 123 may not output presence information when the distance between an object and the vehicle V at the time when the detection unit 121 first detects the object is equal to or less than a determination distance preset as a distance at which the splash W is detected and the detection continuation time period is equal to or less than the predetermined time period. The information output unit 123 outputs presence information when the detection distance from an outer edge of the vehicle V to the object is larger than the determination distance.

Figure 3:
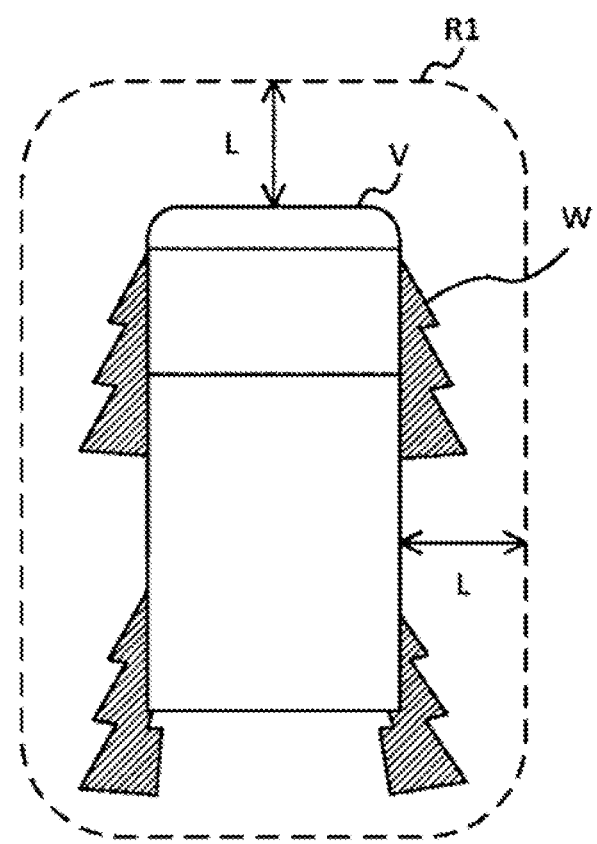
FIG. 3 is a view illustrating an example of a determination distance.

FIG. 3 is a view illustrating an example of the determination distance. A determination distance L illustrated in FIG. 3 is, for example, two meters. Since the information output unit 123 does not determine the detected object as the detection target object when a position of the object at the time when the detection unit 121 first detects the object is inside a broken line R1 illustrated in FIG. 3 and the detection continuation time period is equal to or less than the predetermined time period, the detection device 1 can make it difficult to erroneously detect the splash W generated in the vicinity of the vehicle V.

Figure 4:
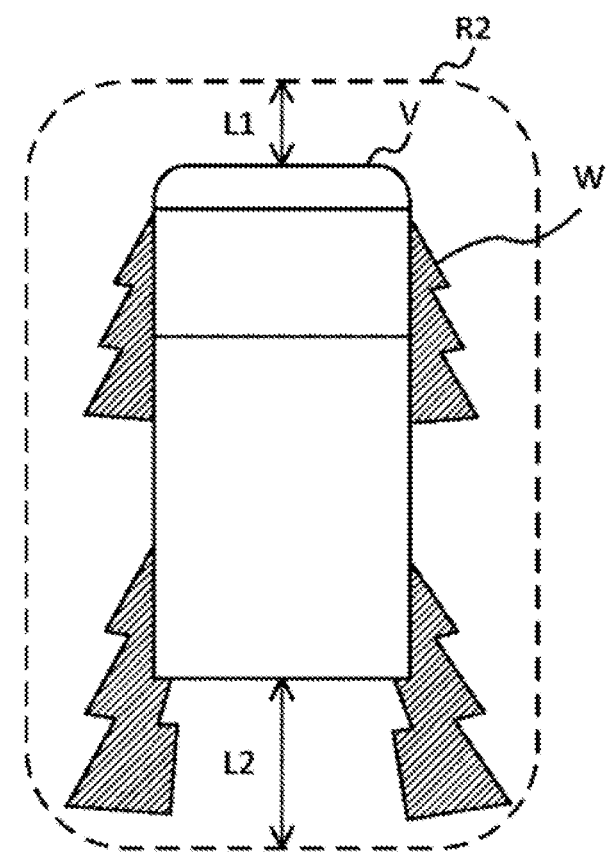
FIG. 4 is a view illustrating another example of the determination distance.

FIG. 4 is a view illustrating another example of the determination distance. When the vehicle V is traveling forward, a range in which the detection unit 121 can first detect the splash W is wider on a rear side of the vehicle V than on a front side of the vehicle V. Therefore, in an example illustrated in FIG. 4, the determination distance differs depending on the position of the vehicle. That is, a determination distance on the front side of the vehicle is L1 and a determination distance on the rear side of the vehicle is L2, which is larger than L1.

By the way, when the vehicle V passes through a puddle, front wheels of the vehicle pass through the puddle and then rear wheels of the vehicle pass through the puddle. As a result, an amount of the splash W generated on the front side of the vehicle V tends to be larger than an amount of the splash W generated on the rear side of the vehicle V. Therefore, the time that the splash generated on the front side of the vehicle V is continuously specified as the same object tends to be longer than the time that the splash W generated on the rear side of the vehicle V is continuously specified as the same object. Therefore, the information output unit 123 may change the determination time period according to the position where the detection unit 121 first specifies the object. For example, the information output unit 123 makes the determination time period used as a threshold value for determining whether the object detected on the traveling direction side of vehicle V is a detection target object set to be longer than the determination time period used as a threshold value for determining whether the object detected on the opposite side of the vehicle V in the traveling direction is the detection target object. By doing so, even when the time during which the splash W generated on the front side of the vehicle V is continuously detected as an object is longer than the time during which the splash W generated on the rear side of the vehicle V is continuously detected as an object, the detection device 1 is less likely to erroneously detect the splash W generated on the front side of the vehicle V as a detection target object.

Figure 5:
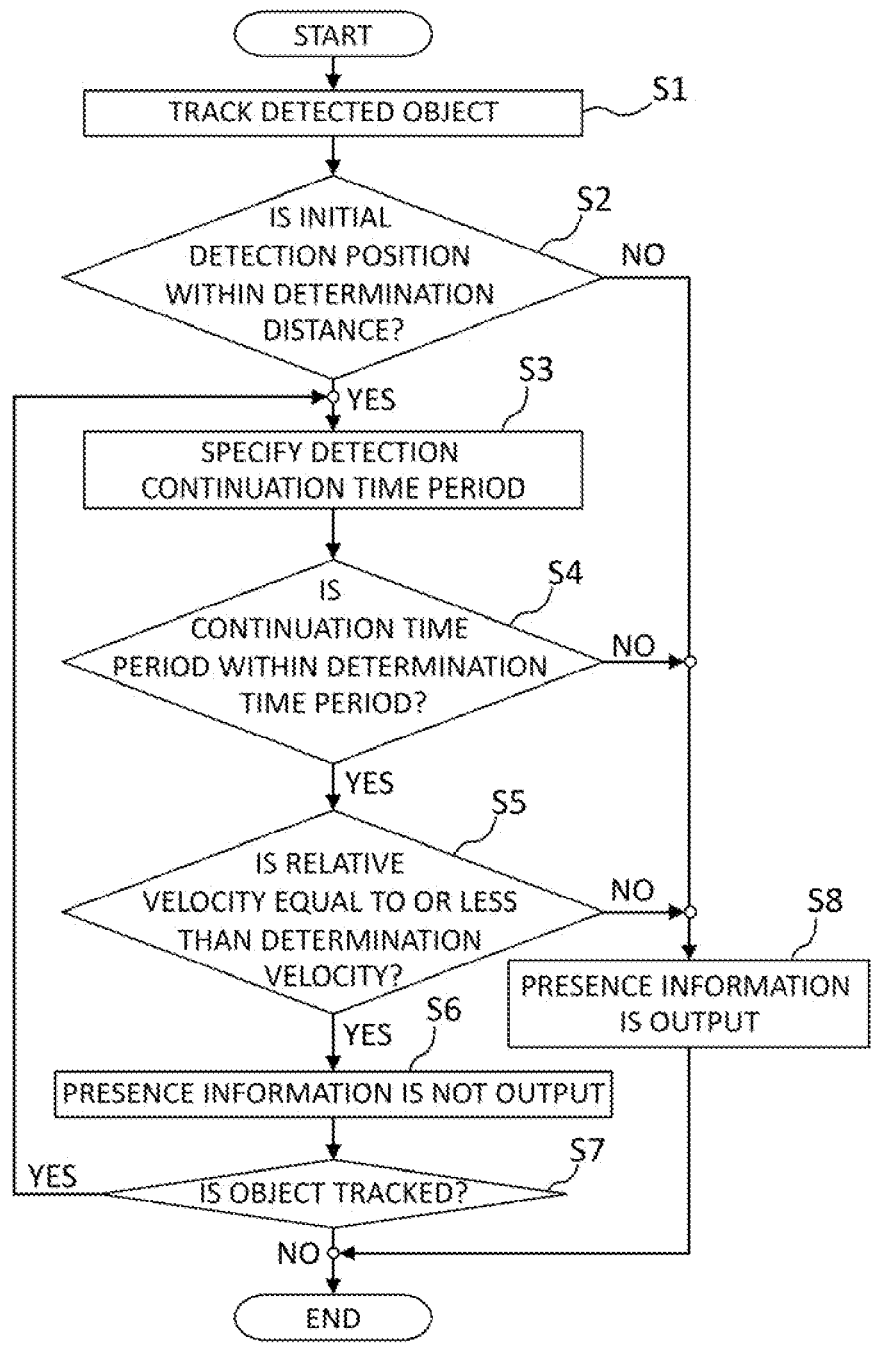
FIG. 5 is a flowchart illustrating a flow of processing for outputting presence information.

FIG. 5 is a flowchart illustrating a flow of processing for outputting presence information. First, the detection unit 121 tracks the detected object (Step S1). Subsequently, the information output unit 123 determines whether an initial position where the object is detected is within the determination distance (Step S2).

When the initial position where the object is detected is within the determination distance (Yes in Step S2), the specification unit 122 specifies the detection continuation time period (Step S3). The information output unit 123 determines whether the detection continuation time period is within the determination time period (Step S4). When the detection continuation time period is within the determination time period (Yes in Step S4), the information output unit 123 determines whether the relative velocity detected by the detection unit 121 is equal to or less than the determination velocity (Step S5).

When the relative velocity is equal to or less than the predetermined velocity (Yes in Step S5), the information output unit 123 does not output presence information (Step S6). The information output unit 123 determines whether the detection unit 121 tracks the object (Step S7). The information output unit 123 returns to Step S3 when the detection unit 121 tracks the object (Yes in Step S7). When the detection unit 121 does not track the object (No in Step S7), the information output unit 123 ends the process without outputting presence information.

When the initial detection position is farther than the determination distance (No in Step S2), when the detection time period is longer than the determination time period (No in Step S4), or when the relative velocity is larger than the determination velocity (No in Step S5), the information output unit 123 outputs presence information (Step S8). By doing so, the detection device 1 can output presence information indicating the presence of an object such as a present vehicle V or a person. Further, the detection device 1 does not output presence information even when the splash W which disappears with the lapse of time is detected. Therefore, the detection device 1 can suppress erroneous detection of the splash W as the detection target object.

First Modification Example

Figure 6:
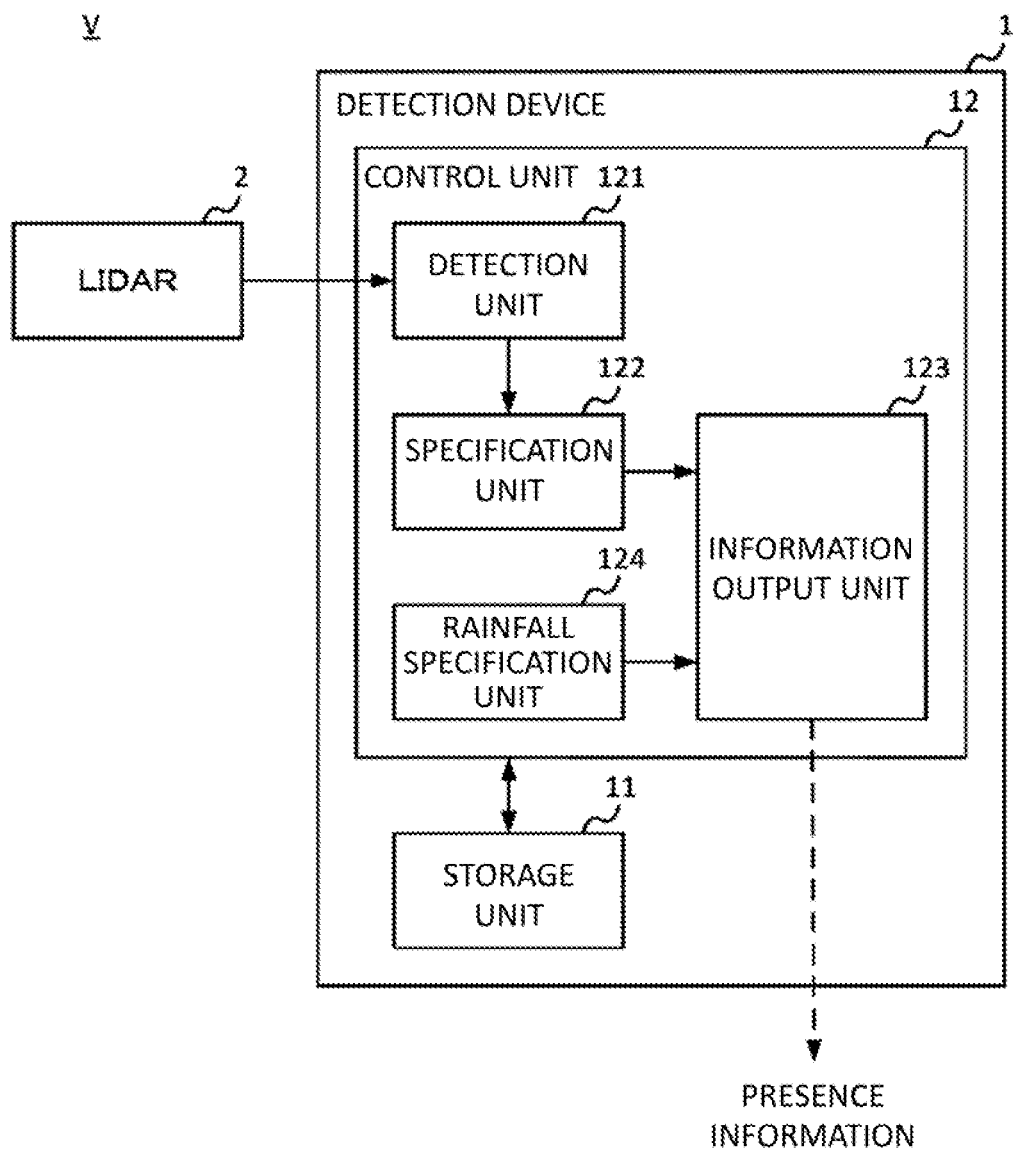
FIG. 6 is a diagram illustrating a configuration of a detection device according to a first modification example.

The detection device 1 may determine whether to output presence information based on a rainfall condition of the road on which the vehicle V travels. FIG. 6 is a diagram illustrating a configuration of the detection device 1 according to a first modification example. The control unit 12 of the detection device 1 according to the first modification example realizes a function as a rainfall specification unit 124 by executing the program stored in the storage unit 11.

The rainfall specification unit 124 specifies the rainfall condition of the road on which the vehicle V travels. For example, the rainfall specification unit 124 specifies whether it has rained on the road on which the vehicle V travels. Specifically, the rainfall specification unit 124 specifies whether it has rained at a time before the current time. For example, the rainfall specification unit 124 specifies that it has rained on the road when a wiper of the vehicle V has operated at a time before the current time.

When the rainfall specification unit 124 specifies that it does not rain on the road, the information output unit 123 outputs presence information even when the detection continuation time period is equal to or less than the determination time period. When the rainfall specification unit 124 specifies that it has rained on the road, the information output unit 123 outputs presence information on condition that the detection continuation time period exceeds the determination time period. By doing so, the detection device 1 prevents the object detected by the detection unit 121 from being erroneously determined to be the splash W in a situation where it does not rain on the road and the splash W does not occur, and also the detection device 1 can reduce the load on the control unit 12.

The rainfall specification unit 124 may specify whether it is raining at the current time. For example, the rainfall specification unit 124 specifies that it is raining at the current time when the wiper of the vehicle V is in operation and the rainfall specification unit 124 specifies that it is not raining at the current time when the wiper of the vehicle V is not in operation. When the rainfall specification unit 124 specifies that it is raining at the current time, the information output unit 123 outputs presence information on condition that the detection continuation time period exceeds the determination time period. The information output unit 123 outputs presence information even when the detection continuation time period is equal to or less than the determination time period when the rainfall specification unit 124 specifies that it is not raining at the current time. By doing so, the detection device 1 can prevent erroneous detection of the splash W as a detection target object during rainfall in which splash is likely to occur.

The more rainfall there is, the more water there is on the road. As the amount of water present on the road increases, the amount of splash W generated when the vehicle V travels also increases, and thus the time required for the splash W generated around the vehicle V to disappear increases. Therefore, the detection device 1 changes the determination time period for determining whether it is a detection target object based on the amount of rainfall on the road on which the vehicle V travels.

The rainfall specification unit 124 may specify the amount of rainfall on the road on which the vehicle V travels. For example, the rainfall specification unit 124 specifies that the greater the number of wiper operations per unit time, the greater the amount of rainfall. The rainfall specification unit 124 may acquire information indicating the weather in an area including the road on which the vehicle travels and specify whether it has rained based on the acquired weather information indicating the weather. In this case, the rainfall specification unit 124 specifies the amount of rainfall based on the information indicating the amount of rainfall included in the weather information. The information output unit 123 lengthens the determination time period as the amount of rainfall specified by the rainfall specification unit 124 increases. By doing so, the detection device 1 can suppress erroneous detection of the splash W as a detection target object even when the time required for the splash W to disappear becomes long.

The rainfall specification unit 124 may specify whether it will rain at a time later than the current time. First, the rainfall specification unit 124 specifies the probability of precipitation indicating the probability of rain at each of a plurality of future times based on weather forecast information which predicts the weather at a time later than the current time. The rainfall specification unit 124 specifies the time when the probability of precipitation becomes equal to or higher than a predetermined value. The predetermined value is, for example, 30%. The information output unit 123 outputs presence information even when the detection continuation time period is equal to or less than the determination time period until the time when the precipitation probability specified by the rainfall specification unit 124 becomes equal to or more than the predetermined value elapses. Further, the information output unit 123 outputs presence information on condition that the detection continuation time period exceeds the determination time period at the time after the time when the probability of precipitation becomes equal to or higher than the predetermined value elapses.

Second Modification Example

Figure 7:
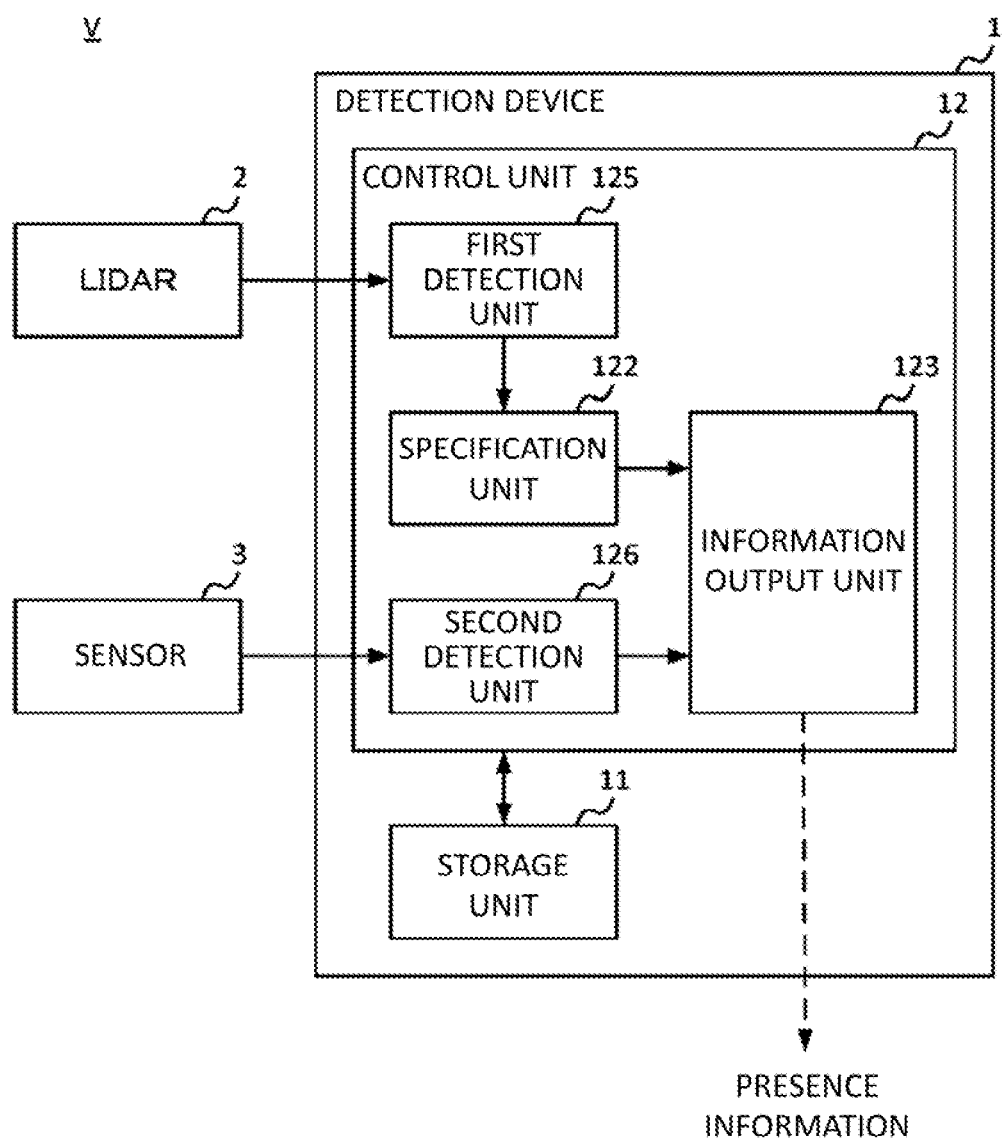
FIG. 7 is a diagram illustrating a configuration of a detection device according to a second modification example.

The detection device 1 may output presence information when it is determined that the object detected based on the detection result detected by the LIDAR 2 included in the vehicle V and the object detected by using a sensor different from the LIDAR 2 are the same object. FIG. 7 is a diagram showing a configuration of the detection device 1 according to a second modification example. The vehicle V on which the detection device 1 according to the second modification example is mounted includes a sensor 3 different from the LIDAR 2. The sensor 3 is, for example, a millimeter-wave radar, which is a sensor that is unlikely to erroneously detect a splash, or a camera, which is a sensor that easily specifies the type of detection target object.

The control unit 12 of the detection device 1 according to the second modification example realizes the functions as a first detection unit 125 and a second detection unit 126 by executing the program stored in the storage unit 11. Since the first detection unit 125 is the same as the detection unit 121 described above, the description thereof will be omitted.

The second detection unit 126 detects an object present around the vehicle V by using a method different from that of the first detection unit 125. For example, when the sensor 3 is a camera, the second detection unit 126 detects an object present around the vehicle V by analyzing the captured image captured by the camera. Specifically, the second detection unit 126 specifies the position and time when the object is detected. In addition, the second detection unit 126 may specify the distance between the vehicle V and the object and the relative velocity between the object and the vehicle V.

The information output unit 123 determines whether the object detected by the first detection unit 125 and the object detected by the second detection unit 126 are the same object. For example, the information output unit 123 determines that the objects are the same when the position and time when the first detection unit 125 detects the object and the position and time when the second detection unit 126 detects the object match, and if not, it is determined that the objects are not the same object. Further, the information output unit 123 may determine whether the objects are the same based on whether the distance between the vehicle V and the object or the relative velocity between the object and the vehicle V match. The information output unit 123 outputs presence information on condition that the object detected by the first detection unit 125 and the object detected by the second detection unit 126 are the same object.

In this way, the detection device 1 detects an object using not only the information of the LIDAR 2 but also the information of other sensors. Therefore, the detection device 1 is less likely to erroneously detect the splash W as the detection target object as compared with the case where the object is detected using only the information of the LIDAR 2.

Effect of Detection Device 1 According to Embodiment

As described above, the detection device 1 outputs information indicating that the detected object is present, on condition that the detection continuation time period for continuously detecting the object present around the vehicle exceeds the determination time period. By doing so, the detection device 1 does not output the presence information of the object that cannot be tracked before the time required from the occurrence of the splash W to the disappearance of the splash W elapses, and thus it is possible to suppress erroneously detection of the splash W as a detection target object.

Although the present disclosure is described above using the embodiment, the technical scope of the present disclosure is not limited to the scope described in the above embodiment and various modifications and changes can be made within the scope of the gist. For example, all or a part of the device can be functionally or physically distributed or integrated in any unit. Also, new embodiments resulting from any combination of a plurality of embodiments are included in the embodiments of the present disclosure. An effect of the new embodiment produced by the combination has the effect of the original embodiment.

This application is based on a Japanese patent application filed on Mar. 27, 2019 (Japanese Patent Application No. 2019-061342), the contents of which are incorporated herein by reference.

INDUSTRIAL APPLICABILITY

The detection device and the detection method of the present disclosure are useful in that the device for detecting an object around the vehicle suppresses erroneous detection of a splash or a mud splash as a detection target object.

LIST OF REFERENCE NUMERALS 1 detection device
2 LIDAR
3 sensor
11 storage unit
12 control unit
121 detection unit
122 specification unit
123 information output unit
124 rainfall specification unit
125 first detection unit
126 second detection unit

The invention claimed is:

1. A detection device comprising:
a detection unit that detects an object present around a vehicle;
a specification unit that specifies a detection continuation time period in which the detection unit continuously detects the object; and
an information output unit that outputs presence information indicating that the detection unit detects a detection target object, on condition that the detection continuation time period specified by the specification unit exceeds a determination time period,
wherein the determination time period is lengthened as an amount of rainfall on a road on which the vehicle travels increases,
wherein the detection unit further detects a distance between the object and the vehicle at a time of detecting the object, and
wherein the information output unit does not output the presence information, in a case where the distance at a time when the detection unit first detects the object is equal to or less than a determination distance preset as a distance at which a splash or a mud splash is detected, and in a case where the detection continuation time period is equal to or less than the determination time period.

2. The detection device according to claim 1,
wherein the detection unit further detects a relative velocity between the object and the vehicle, and
the information output unit outputs the presence information, on condition that the relative velocity detected by the detection unit is equal to or higher than a predetermined value.

3. The detection device according to claim 1, further comprising:
a rainfall specification unit that specifies a rainfall condition of the road on which the vehicle travels,
wherein the information output unit determines whether to output the presence information based on the rainfall condition of the road specified by the rainfall specification unit.

4. The detection device according to claim 3, further comprising:
the rainfall specification unit that specifies the amount of rainfall on the road on which the vehicle travels,
wherein the information output unit lengthens the determination time period as the amount of rainfall specified by the rainfall specification unit increases.

5. The detection device according to claim 1, further comprising:
another detection unit that detects an object present around the vehicle using a method different from that of the detection unit,
wherein the information output unit outputs the presence information, on condition that an object detected by the another detection unit and an object detected by the detection unit are determined to be a same object.

6. A detection method comprising steps, being executed by a processor installed in a vehicle, of:
detecting an object present around the vehicle;
specifying a detection continuation time period in which the object is continuously detected; and
outputting information indicating that a detection target object is detected, on condition that the specified detection continuation time period exceeds a determination time period,
wherein the determination time period is lengthened as an amount of rainfall on a road on which the vehicle travels increases,
wherein the detecting the object includes detecting a distance between the object and the vehicle at a time of detecting the object, and
wherein the outputting information does not include outputting the information, in a case where the distance at a time when the detecting the object first detects the object is equal to or less than a determination distance preset as a distance at which a splash or a mud splash is detected, and in a case where the detection continuation time period is equal to or less than the determination time period.

* * * * *